(12) United States Patent
Suciu et al.

(10) Patent No.: US 9,644,537 B2
(45) Date of Patent: May 9, 2017

(54) FREE STREAM INTAKE WITH PARTICLE SEPARATOR FOR REVERSE CORE ENGINE

(71) Applicant: UNITED TECHNOLOGIES CORPORATION, Hartford, CT (US)

(72) Inventors: Gabriel L Suciu, Glastonbury, CT (US); Jesse M Chandler, South Windsor, CT (US); Steven H Zysman, Amston, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 522 days.

(21) Appl. No.: 14/142,968

(22) Filed: Dec. 30, 2013

(65) Prior Publication Data

US 2014/0260182 A1   Sep. 18, 2014

Related U.S. Application Data

(60) Provisional application No. 61/781,840, filed on Mar. 14, 2013.

(51) Int. Cl.
| | | |
|---|---|---|
| *F02C 7/052* | (2006.01) | |
| *B64D 33/02* | (2006.01) | |
| *F02C 3/10* | (2006.01) | |
| F02C 7/04 | (2006.01) | |
| B64D 27/14 | (2006.01) | |
| B64D 27/20 | (2006.01) | |

(52) U.S. Cl.
CPC .............. *F02C 7/052* (2013.01); *B64D 33/02* (2013.01); *F02C 3/10* (2013.01); B64D 27/14 (2013.01); B64D 27/20 (2013.01); B64D 2033/0246 (2013.01); F02C 7/04 (2013.01); F05D 2250/314 (2013.01)

(58) Field of Classification Search
CPC .......... F02C 7/042; F02C 7/057; F02C 7/052; F02K 3/077; F02K 7/16; B64D 27/14; B64D 27/16; B64D 27/20; B64D 29/04; B64D 33/02; B64D 2033/0286; B64D 2033/0246
See application file for complete search history.

(56) References Cited

U.S. PATENT DOCUMENTS

| | | | | |
|---|---|---|---|---|
| 2,334,561 A | | 11/1943 | Kopplin | |
| 3,054,577 A | * | 9/1962 | Wolf ...................... | B64D 27/12 244/110 B |
| 3,068,647 A | * | 12/1962 | Santamaria ......... | B64C 29/0066 244/12.5 |

(Continued)

FOREIGN PATENT DOCUMENTS

| | | |
|---|---|---|
| EP | 0426500 A1 | 5/1991 |
| GB | 603283 A | 6/1948 |

OTHER PUBLICATIONS

Norris, G. and Warwick, G., "A Reversed, Tilted Future for Pratt's Geared Turbofan?", Aviation Week & Space Technology, Mar. 26, 2015.*

*Primary Examiner* — Ehud Gartenberg
*Assistant Examiner* — Lorne Meade
(74) *Attorney, Agent, or Firm* — Bachman & LaPointe, P.C.

(57) ABSTRACT

A gas turbine engine has a fairing and an air intake that includes an air inlet embedded within the fairing for supplying free stream atmospheric air to a gas generator.

11 Claims, 4 Drawing Sheets

(56) References Cited

U.S. PATENT DOCUMENTS

| | | | | |
|---|---|---|---|---|
| 3,117,748 | A * | 1/1964 | Gerlaugh | B64C 29/0016 244/15 |
| 3,131,536 | A | 5/1964 | Snell | |
| 3,318,095 | A * | 5/1967 | Snell | B64C 29/0066 60/224 |
| 3,329,377 | A * | 7/1967 | Peterson | B64D 15/00 244/53 B |
| 3,667,703 | A | 6/1972 | Boek | |
| 3,952,972 | A * | 4/1976 | Tedstone | B64D 33/02 244/53 B |
| 4,052,845 | A | 10/1977 | Tumavicus | |
| 4,193,262 | A * | 3/1980 | Snell | F02C 7/32 60/262 |
| 4,250,703 | A * | 2/1981 | Norris | B64D 33/02 244/53 B |
| 4,346,860 | A * | 8/1982 | Tedstone | F02C 7/05 244/53 B |
| 4,500,055 | A * | 2/1985 | Krojer | B64D 27/14 244/55 |
| 5,216,879 | A | 6/1993 | Zysmaan | |
| 6,543,718 | B2 * | 4/2003 | Provost | B64C 11/001 244/12.4 |
| 6,651,929 | B2 * | 11/2003 | Dionne | B64D 33/08 165/44 |
| 6,845,606 | B2 * | 1/2005 | Franchet | F02K 3/025 60/225 |
| 7,107,756 | B2 * | 9/2006 | Rolt | F02K 3/06 60/224 |
| 7,237,378 | B2 | 7/2007 | Lardellier | |
| 7,540,450 | B2 * | 6/2009 | Brand | B64D 27/14 244/54 |
| 7,581,694 | B2 * | 9/2009 | Guering | B64D 27/14 244/53 B |
| 7,665,689 | B2 * | 2/2010 | McComb | B64C 15/02 244/12.3 |
| 7,770,377 | B2 * | 8/2010 | Rolt | F02K 3/06 60/226.1 |
| 8,176,725 | B2 | 5/2012 | Norris et al. | |
| 8,256,709 | B2 * | 9/2012 | Negulescu | B64D 27/08 244/54 |
| 8,438,829 | B2 * | 5/2013 | Negulescu | B64D 27/10 244/69 |
| 8,701,381 | B2 * | 4/2014 | Eames | B64C 11/346 60/39.163 |
| 8,708,274 | B2 * | 4/2014 | Lord | B64D 27/14 244/55 |

* cited by examiner

FREE STREAM INTAKE WITH PARTICLE SEPARATOR FOR REVERSE CORE ENGINE

CROSS REFERENCE TO RELATED APPLICATION(S)

This application claims the benefit of provisional application Ser. No. 61/781,840, filed Mar. 14, 2013.

STATEMENT OF GOVERNMENT INTEREST

The Government of the United States of America may have rights in the present invention as a result of NASA Cooperative Agreement Contract No. NNX11AB35A and Sub-Contract No. MIT/PW Subaward No. 5710002937 awarded by NASA.

BACKGROUND

The present disclosure relates to a free stream inlet for a propulsion system which includes a gas generator which is a reverse core engine.

Typical multi-spool turbofan engines include a nested core, in which a high pressure, or core, spool is nested inside a low pressure spool. Such a nested core engine includes, in axial sequence, a low pressure compressor, a high pressure compressor, a combustor section, a high pressure turbine, and a low pressure turbine. The high pressure compressor is connected to the high pressure turbine with a high pressure shaft that extends through the combustor section. The low pressure compressor is connected to the low pressure turbine with a low pressure shaft that extends through the high pressure shaft. Increases in efficiency of the turbofan allow for the core to be reduced in size, such as by having a smaller diameter. The low pressure shaft, however, cannot be reduced in diameter because the rotational speeds of the low pressure spool are limited by critical speed. The shaft critical speed is proportional to the shaft diameter and inversely proportional to the shaft length. Thus, decreasing the shaft diameter with reduced core sizes is not possible without reducing the shaft length if the same critical speed is desired. Thus, reductions in the core size yields compromises in the high pressure spool to accommodate low pressure spool shaft diameters. For example, the size and weight of high pressure spool rotor disk need to be increased to accommodate openings for larger low pressure shaft sizes. As such, there is a need for improving engine architectures to allow for, among other things, decreased core sizes resulting from more efficient turbofan engines.

There has been proposed a gas turbine engine comprising a fan drive gear system, a low spool connected to the fan drive gear system, and a high spool disposed aft of the low spool. The low spool comprises a rearward-flow low pressure compressor disposed aft of the fan drive gear systems, and a forward flow low pressure turbine disposed aft of the low pressure compressor. The high spool comprises a forward flow high pressure turbine disposed aft of the low pressure turbine, a combustor disposed of aft of the high pressure turbine, and a forward-flow high pressure compressor disposed aft of the combustor.

One issue faced by designers of these new engine architectures is incorporation of the new engine architecture into an aircraft.

SUMMARY

In accordance with the present disclosure, there is provided a gas turbine engine which broadly comprises a fairing and an air intake that includes an air inlet embedded within the fairing for supplying free stream atmospheric air to a gas generator.

In another and alternative embodiment, the air intake further comprises a curved duct attached to the air inlet.

In another and alternative embodiment, the air intake further comprises a particle separation outlet.

In another and alternative embodiment, the particle separation outlet communicates with a channel within the fairing and a particle outlet located at a trailing edge of the fairing.

In another and alternative embodiment, the engine includes an exterior wall surrounding at least a portion of the engine core, where the fairing has an upper surface, a lower surface, an outer edge, and an inner edge, and the inner edge is blended into the exterior wall surrounding at least the portion of the engine core.

Further in accordance with the present invention, there is provided an aircraft which broadly comprises a fuselage; a propulsion system having a pair of gas generators located at a tail section of the fuselage; each of the gas generators comprising a reverse engine core; the propulsion system further having a propulsor section with a pair of free turbines and a pair of fans driven by the free turbines; the free turbines being driven by a fluid generated by the gas generators; and a pair of fairings mounted to the tail section of the fuselage; and an air intake embedded within each of the fairings to supply free stream atmospheric air to the gas generators.

In another and alternative embodiment, the aircraft further comprises the propulsor section having a central axis and the gas generator having a longitudinal axis at an angle to the central axis.

In another and alternative embodiment, each of the air intakes comprises an air inlet and a curved duct connected to the air inlet.

In another and alternative embodiment, each of the air intakes has a particle separator and an outlet for discharging solid particles.

In another and alternative embodiment, each of said air intakes has a channel within each of the fairings communicating with the outlet.

In another and alternative embodiment, each of the fairings has an inner edge, an outer edge, an upper surface, and a lower surface.

In another and alternative embodiment, the aircraft further comprises a wall surrounding a least a portion of each of the gas generators and the inner edges of the fairings blending into the wall.

Further in accordance with the present disclosure, there is provided a propulsion system which broadly comprises a propulsor section having a free turbine and a fan driven by the free turbine; a gas generator for generating a fluid for driving the free turbine; an air intake for supplying free stream air to the gas generator; and the air intake comprising an inlet, a curved duct connected to the air inlet, and an outlet connected to an inlet of the gas generator.

In another and alternative embodiment, the propulsion system further comprises the free turbine and the fan rotating about a first axis and the gas generator having a longitudinal axis at an angle to the first axis.

In another and alternative embodiment, the gas generator comprises a reverse engine core.

In another and alternative embodiment, the propulsion system further comprises a plenum for delivering the fluid to the free turbine and the plenum communicating with an outlet of the gas generator.

In another and alternative embodiment, the air intake delivers the free stream air to a compressor section of the gas generator.

In another and alternative embodiment, the air intake further has a particle separator.

Other details of the free stream intake for a reverse core engine are set forth in the following detailed description and the accompanying drawings wherein like reference numerals depict like elements.

DETAILED DESCRIPTION

Figure 1:
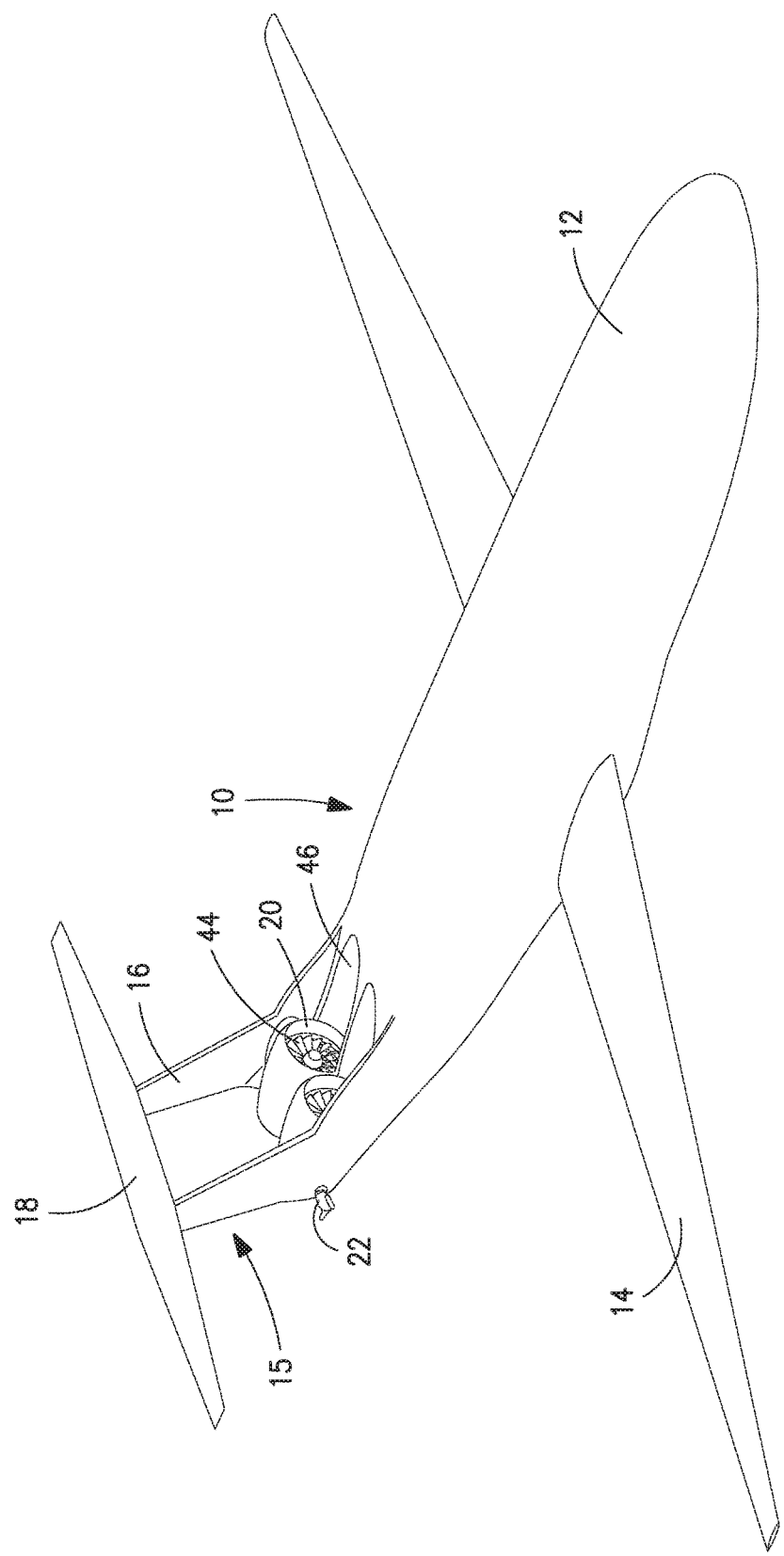
FIG. 1 is a schematic representation of an aircraft.

FIG. 1 illustrates an aircraft 10 having a fuselage 12, wings 14, and a tail 15 having vertical tail surfaces 16 and a tail wing 18 mounted to the tail surfaces 16. A propulsion system 20 is mounted to the fuselage 12 at the base of the tail 15. The inlet 44 to propulsion system 20 includes a pair of inlet channel 46 in the fuselage 12 for delivering atmospheric air. An aerodynamic fairing 22 may extend from each side of the fuselage 12 adjacent the tail 15.

Figure 2:
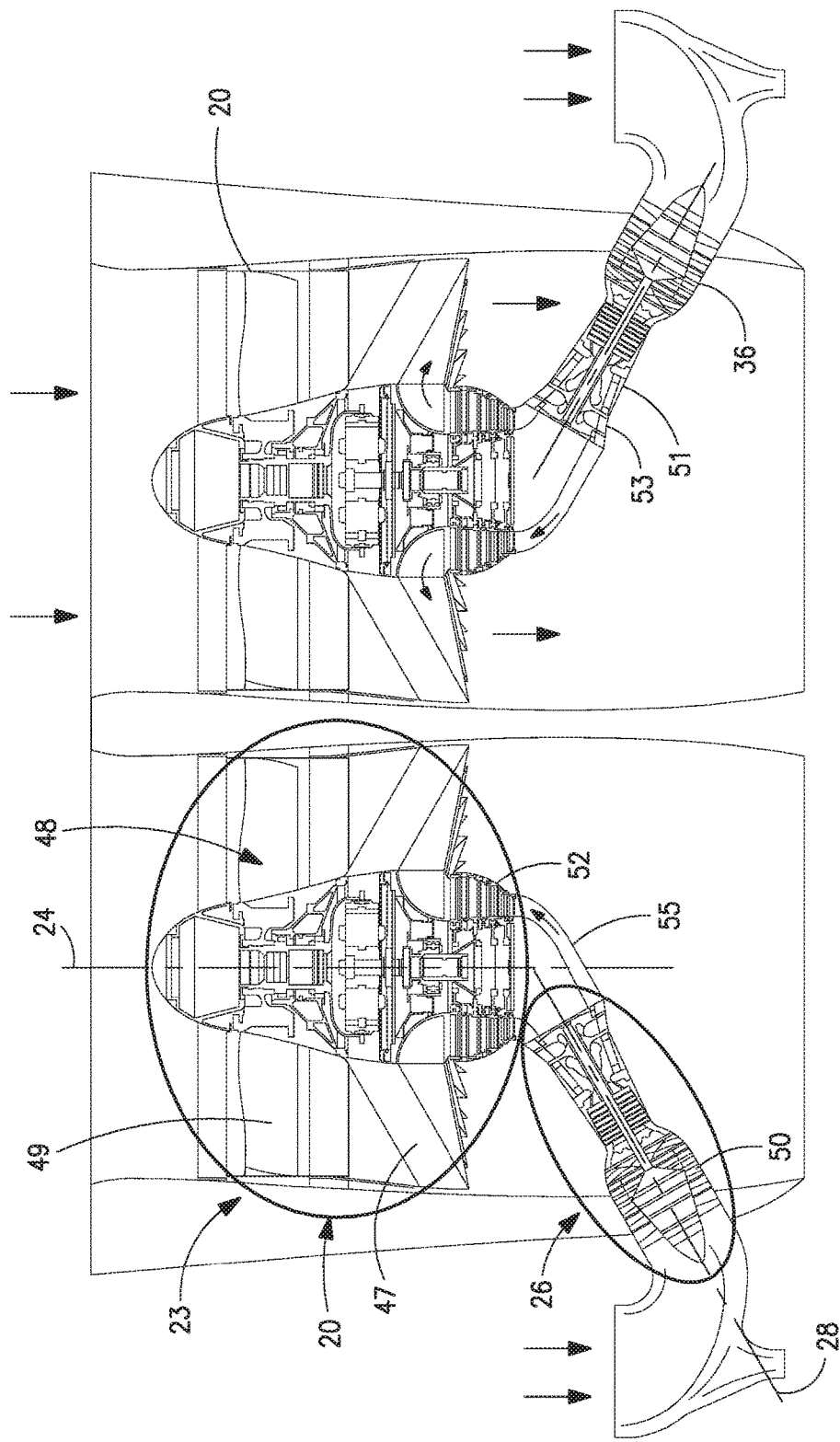
FIG. 2 is a sectional view of a propulsion system with a gas generator.

Referring now to FIG. 2, the propulsion system 20 may comprise a pair of propulsors, which are gas turbine engines. Each propulsor has a propulsor section 23 which has a free turbine 52, a fan 48 having a plurality of fan blades 49 driven by the free turbine 52, and a plurality of fan exit guide vanes 47. The free turbine 52 and the fan 48 rotate about a central axis 24.

The propulsion system 20 further has a pair of gas generators 26. Each of the gas generators 26 has a longitudinal axis or central axis 28 which is at an angle to the central axis 24. Each gas generator 26 is a reverse engine core and includes a compressor section 50 having one or more stages such as a low pressure compressor and a high pressure compressor, a combustion section 51 having one or more combustors, and a turbine section 53 having one or more stages such as a low pressure turbine and a high pressure turbine. The low pressure compressor in the gas generator 26 is driven by a low pressure turbine via a low pressure spool and a high pressure compressor in the gas generator 26 is driven by a high pressure turbine via a high pressure spool. Each gas generator 26 delivers combusted fuel to a respective one of the free turbine 52 via a plenum 55 to drive the respective free turbine 52. Each free turbine 52 drives the respective fan 48.

Figure 3:
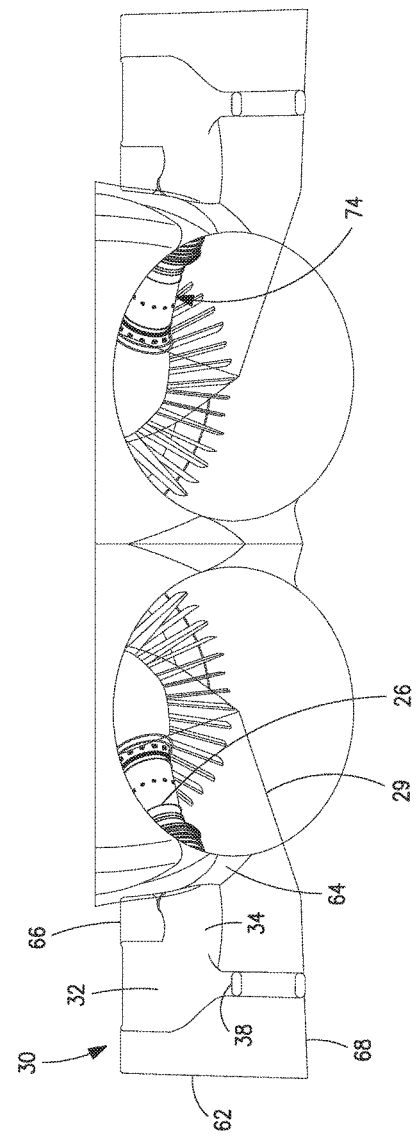
FIG. 3 is a rear view of the propulsion system of the aircraft.

Referring now to FIG. 3, the gas generator 26 may be housed within a bi-fi wall 29. The gas generator 26 may be fully or partially housed within the bi-fi wall 29. An air inlet device 30 to be discussed below may be used to provide free stream air to an inlet of each gas generator 26.

Figure 4:
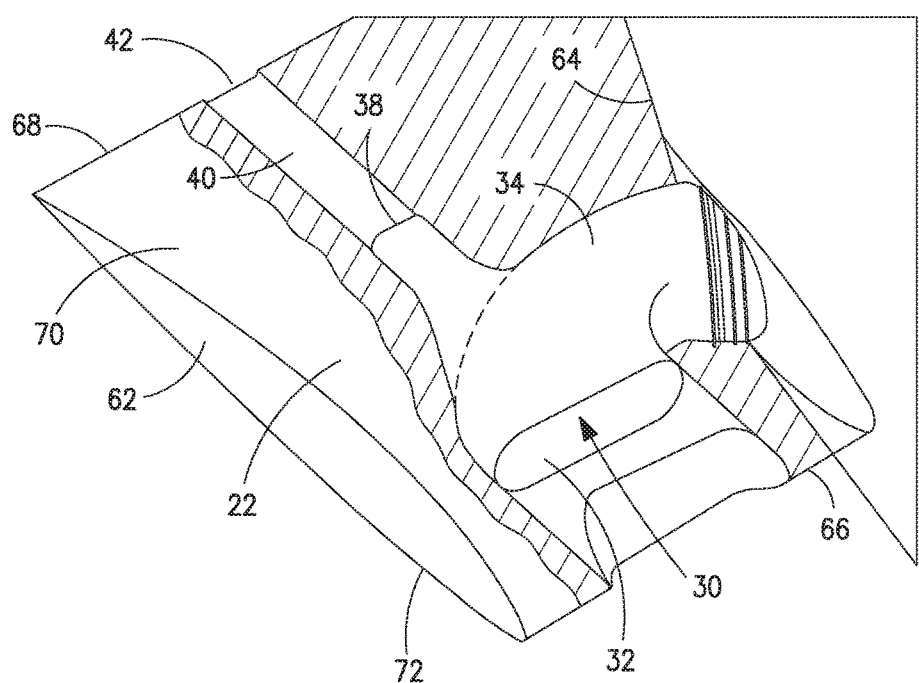
FIG. 4 is a sectional view of the aerodynamic fairing containing an air inlet for the gas generator.

Referring now to FIG. 4, the aerodynamic fairing 22 has an outer edge 62, an inner edge 64, a leading edge 66, and a trailing edge 68. The aerodynamic fairing 22 further has an upper surface 70 and a lower surface 72. The upper and lower surfaces 70 and 72 may be shaped to generate lift. As shown in FIG. 3, the inner edge 64 of the fairing 22 may be blended into the bi-fi wall 29 surrounding the core 74 of the gas generators 26.

As shown in FIG. 4, each air inlet 30 may be embedded or shrouded within a respective one of the aerodynamic fairings 22. The air inlet 30 may have an intake 32 for receiving free stream air, a curved duct 34 for supplying the free stream air to a low pressure compressor section 36 of a respective one of the gas generators 26. The air inlet 30 further has a particle separation outlet 38 which allows solid particles in the free stream air to exit the air inlet 30. The particle separation outlet 38 may communicate with a channel 40 having an outlet 42 in the aerodynamic fairing 22. In operation, the free stream air entering the air inlet 30 may have particles of solid material, such as dust, ice, etc. These particles tend not to follow the curvature of the air inlet and continue on straight into the particle separation outlet 38. The intake 32 may be located at the leading edge 66 or may be spaced from the leading edge 66.

The air inlet 30 may be used to supply atmospheric air to a respective gas generator 26 via a duct which causes the atmospheric air to impinge upon the low pressure compressor section 36 of the gas generator 26.

There has been provided a free stream intake for a reverse core engine. While the intake has been described in the context of specific embodiments thereof, other unforeseen alternatives, modifications, and variations may become apparent to those skilled in the art. Accordingly, it is intended to embrace those alternatives, modifications, and variations as fall within the broad scope of the appended claims.

What is claimed is:

1. A gas turbine engine freestream intake, comprising:
   a wing-shaped fairing having a leading edge, a trailing edge, an inner edge, an upper surface, a lower surface, and an outer edge surface extending from the leading edge to the trailing edge;
   an air intake connected to an air inlet embedded within the wing-shaped fairing, said air intake located in said leading edge and supplying free stream atmospheric air to a gas generator within a gas turbine engine;
   a curved duct connected to said air inlet, said curved duct turning the free stream atmospheric air towards said inner edge;
   a particle separation outlet connected to an outer curved portion of said curved duct;
   a channel particle outlet located in said trailing edge; and
   a channel connecting said particle separation outlet to said channel particle outlet, wherein solid particles in said free stream atmospheric air follow a substantially straight path from said air intake through said outer curved portion to said particle separation outlet and then through said channel to said channel particle outlet.

2. The gas turbine engine freestream intake of claim 1, including an exterior wall surround at least a portion of an engine core, said inner edge is blended into said exterior wall surrounding at least the portion of said engine core.

3. An aircraft comprising the gas turbine engine freestream intake of claim 1.

4. An aircraft comprising:
   a fuselage;
   a propulsion system comprising
      a pair of gas generators located at a tail section of said fuselage, each one of said pair of gas generators comprising a reverse engine core;
      a propulsor section with a pair of free turbines and a pair of fans, each one of said pair of free turbines driving a respective one of said pair of fans; each one of said pair of free turbines being driven by a fluid generated by a respective one of said pair of gas generators;

a pair of wing-shaped fairings mounted to said tail section of said fuselage, each one of said pair of wing-shaped fairings defined by a leading edge, a trailing edge, an inner edge, an upper surface, a lower surface, and an outer edge surface extending from the leading edge to the trailing edge, each one of the pair of wing-shaped fairings including an air intake located in said leading edge to supply free stream atmospheric air to a respective one of said pair of gas generators;

an air inlet connected to said air intake;

a curved duct connected to said air inlet, said curved duct turning the free stream atmospheric air towards said inner edge;

a particle separation outlet connected to an outer curved portion of said curved duct;

a channel particle outlet located in said trailing edge; and a channel connecting said particle separation outlet to said channel particle outlet, wherein solid particles in said free stream atmospheric air follow a substantially straight path from said air intake through said outer curved portion to said particle separation outlet and then through said channel to said channel particle outlet.

5. The aircraft of claim 4, further comprising said propulsor section having a central axis and said gas generator having a longitudinal axis at an angle to said central axis.

6. The aircraft of claim 4, further comprising a wall surrounding at least a portion of each one of said pair of gas generators and said inner edges of each one of said pair of wing-shaped fairings blending into said wall.

7. An engine comprising:

a propulsor section having a free turbine and a fan driven by said free turbine;

a gas generator for generating a fluid for driving said free turbine;

an air intake for supplying free stream atmospheric air to said gas generator;

a wing-shaped fairing defined by a leading edge, a trailing edge, an inner edge, an upper surface, a lower surface, and an outer edge surface extending from the leading edge to the trailing edge;

an air inlet embedded within the wing-shaped fairing and connected to said air intake located in said leading edge;

a curved duct connected to the air inlet, said curved duct turning the free stream atmospheric air towards said inner edge and an outlet connected to an inlet of said gas generator;

a particle separation outlet connected to an outer curved portion of said curved duct;

a channel particle outlet located in said trailing edge; and a channel connecting said particle separation outlet to said channel particle outlet, wherein solid particles in said free stream atmospheric air follow a substantially straight path from said air intake through said outer curved portion to said particle separation outlet and then through said channel to said channel particle outlet.

8. The engine of claim 7, further comprising said free turbine and said fan rotating about a first axis and said gas generator having a longitudinal axis at an angle to said first axis.

9. The engine of claim 7, wherein said gas generator comprises a reverse engine core.

10. The engine of claim 7, further comprising a plenum for delivering said fluid to said free turbine and said plenum communicating with an outlet of said gas generator.

11. The propulsion system of claim 7, wherein said air intake delivers said free stream atmospheric air to a compressor section of said gas generator.

* * * * *